(12) United States Patent
Watanabe et al.

(10) Patent No.: US 7,091,958 B1
(45) Date of Patent: Aug. 15, 2006

(54) IMAGE PROCESSING DEVICE, IMAGE PROCESSING METHOD, INPUT DEVICE USED THERIN, GAME DEVICE AND RECORDING MEDIUM

(75) Inventors: Shinji Watanabe, Tokyo (JP); Nobuyuki Kadoi, Tokyo (JP)

(73) Assignee: Kabushiki Kaisha Sega Enterprises, Tokyo (JP)

( * ) Notice: Subject to any disclaimer, the term of this patent is extended or adjusted under 35 U.S.C. 154(b) by 0 days.

(21) Appl. No.: 09/000,301

(22) PCT Filed: Jul. 19, 1996

(86) PCT No.: PCT/JP96/02024

§ 371 (c)(1),
(2), (4) Date: Jan. 20, 1998

(87) PCT Pub. No.: WO97/04381

PCT Pub. Date: Feb. 6, 1997

(30) Foreign Application Priority Data

Jul. 20, 1995 (JP) .................................. 7-183927

(51) Int. Cl.
*G06G 5/00* (2006.01)

(52) U.S. Cl. ........................................ 345/173; 345/156

(58) Field of Classification Search ........ 345/156–157, 345/158, 173–175, 176, 177, 207, 179–183; 273/446–447, 156, 369, 148 B; 434/19; 463/30–31, 36, 37, 46, 38, 23, 43, 7–8, 49, 463/52; 178/18.04, 19.02
See application file for complete search history.

(56) References Cited

U.S. PATENT DOCUMENTS 4,240,633 A * 12/1980 Watanabe .................... 463/52
4,415,153 A * 11/1983 Yokoi ......................... 463/23
4,461,475 A * 7/1984 Nakamura .................... 463/7
5,253,187 A * 10/1993 Kaneko et al. .......... 178/18.04
5,571,267 A * 11/1996 Yokoi et al. ................. 273/446

(Continued)

FOREIGN PATENT DOCUMENTS

JP 56-119280 9/1981

(Continued)

OTHER PUBLICATIONS

Japanese Notice of Rejection with English Translation.

*Primary Examiner*—Xiao Wu
(74) *Attorney, Agent, or Firm*—Keating & Bennett, LLP

(57) ABSTRACT

To provide a device capable of providing input force by striking to an object while providing object movement that is not based on a mechanical structure.

Image signals from a data processing board 15 are supplied to a display 9. An image that is to be struck or another essential image is thus displayed on the display 9. The player uses an input device 2 in the form of a hammer to strike the object displayed on the display 9. An operating signal Ss is thus output from a vibration switch 22 in the input device 2. The operating signal Ss is supplied to the data processing board 15. Based on the operating signal Ss, the entire image on the display 9 is brightened for the prescribed time by the data processing board 15. At this time, the photodetector signals detected by a photodetector substrate 23 in the input device 2 are supplied to the processing board 15. Based on the photodetector signal, the processing board 15 specifies the position where the input device 2 has struck the display 9, and determines the impact between the struck object and the input device 2.

25 Claims, 13 Drawing Sheets

U.S. PATENT DOCUMENTS 5,644,339 A * 7/1997 Mori et al. ............... 345/173
5,736,979 A * 4/1998 Kobayashi et al. ......... 345/177
5,750,941 A * 5/1998 Ishikawa et al. ......... 178/19.02
5,844,547 A * 12/1998 Minakuchi et al. ......... 345/173

FOREIGN PATENT DOCUMENTS

| | | |
|---|---|---|
| JP | 57-3668 | 1/1982 |
| JP | 57-151638 | 9/1982 |
| JP | 62-5434 | 1/1987 |
| JP | 1-124018 | 5/1989 |
| JP | 1-189716 | 7/1989 |
| JP | 2-5623 | 1/1990 |
| JP | 6-67794 | 3/1994 |

* cited by examiner

US 7,091,958 B1

IMAGE PROCESSING DEVICE, IMAGE PROCESSING METHOD, INPUT DEVICE USED THERIN, GAME DEVICE AND RECORDING MEDIUM

TECHNICAL FIELD

The present invention relates to an image processing device, and in particular to a game device. The present invention also relates to an input device that generates a signal specifying a position on a screen in a display means, and outputs the signal to an image processing device. More specifically, the present invention relates to an image processing device and its input device, which are used in a game device. Even more specifically, the game device relates to the field referred to as "whacking games," such as the familiar "mole-whacking game," where a target is struck with a hammer or the like.

BACKGROUND OF THE INVENTION

In the past, game devices referred to as "whacking games" have been constructed in such a way that something which is in the shape of a mole, for example, and which is to be struck (herein after referred to as "object") is mechanically moved up and down or back and forth according to a prescribed system through openings in the front of a case unit. The player strikes the object with a special hammer in a contest with other players over the strikes.

To determine the winner, the game device determines whether or not the strikes are successful under a fixed system. When a strike is judged to be successful, the game device awards a point, which is displayed to the player, and the player can thus compete with other players over these points.

The following problems occur in conventional "whacking" games, however, because the object appears mechanically.

(i) The special hammer is usually furnished with a buffer material to soften the impact of the strike, but the mechanical structure from which the object emerges must be durable because of the substantial force and vigor with which the object is struck. The design of the mechanical structure is thus limited. For example, mechanical parts with high strength must be used, or the front of the object must meet certain requirements, such as the need to be formed into a spherical shape with excellent performance in dispersing stress. This limits the shape of the object, adding to the cost of manufacturing this type of game device.

(ii) Because the object pops up and drops down by means of a mechanical structure, the movement of the object is limited to a reciprocating movement either up and down or backward and forward, making it difficult to achieve more diverse object movement.

An object of the present invention is thus to provide a device, or a peripheral structure thereof, that gives input by contact based on strikes or the like to an object while affording object movement that is not limited to a mechanical structure, and that executes prescribed image processing based on this input. Another object of the present invention is to provide a game device employing this input.

SUMMARY OF THE INVENTION

To achieve these objects, the present invention executes object movement by image processing means, and executes the prescribed processing based on contact data provided by input means to display means for displaying the moving object.

The present invention comprises: image processing means for executing image processing to move an object; display means for displaying an image based on this image processing; contact input means that is movably provided and is brought into contact with the display means by the operation of a player, and that generates a signal for computing the contact position when brought into contact with the display means; position computing means for computing the contact position based on signals from the contact input means; and determination means for determining whether or not a prescribed relationship is established between the contact position and the object display position based on the computed results, wherein the image processing means provides prescribed image processing for the object when it has been determined by the determination means that a prescribed relationship has been established.

In the present invention, it is determined whether or not there is a prescribed relationship between the location where the object is displayed and the point where the input means is brought into contact with the display means, for example, when the point of contact is included in the region where the object is present (when the two collide), and the prescribed image processing is executed when it has been determined that such a relationship has occurred. The game device is constructed in such a way that points are awarded when such a relationship has been determined, so as to determine the winner of the game being played with the input means.

For example, because the object movement is executed by image processing, there are fewer restrictions in the design of the object shape and movement, allowing more diverse shapes and movements to be freely provided.

In the present invention, the input means is operated so as to come into contact with the display means (or protective glass or the like). When the input means comes into contact with the display means, the data necessary for computing the contact point is output to the position computing means. The position computing means computes the point of contact based on this data, and the determination means determines whether or not a prescribed relationship has been established between the object and the input means based on the computed results. When it has been determined by the determination means that such a relationship has been established, the image processing means provides the prescribed image processing for the object, and the game device awards a point.

The display means is preferably a CRT display, and even more preferably a protective cover is provided on the front of the CRT display. The front of the image display surface or the protective cover of the display means is arranged so that the angle formed by the normal line in the center with respect to the perpendicular direction ranges from 3 to 17 degrees. Such an incline makes it relatively easier to bring the input means into contact with the display means.

The input means is furnished with a switch means allowing data to be output when brought into contact with the display means, so as to prevent data from being unintentionally output when no contact is made. The switch means is preferably a vibration switch.

The device pertaining to the present invention further comprises photoreceiver means for light emitted from the scanning lines of the CRT display serving as the display means. The position computing means begins the necessary processing to obtain the point of contact based on output from the switch means. When a detection signal is input from the photoreceiver means, data on the position of the scanning point obtained based on the scan synchronizing signal is incorporated, and the point of contact is computed based on this data, allowing the contact point to be accurately and rapidly computed.

Since the input means is furnished with a buffer to soften the impact during contact at the position of contact on the display means, the input means and display means are more durable.

The present invention is also a recording medium on which is recorded the procedure by which the aforementioned method is executed by the processing device. Examples of recording media include floppy disks, magnetic tape, photomagnetic disks, CD-ROM, DVD, ROM cartridges, battery back-up-equipped RAM memory cartridges, flash memory cartridges, and nonvolatile RAM cartridges. A recording medium is that on which data is recorded by any processing means (primarily digital data and programs), allowing the desired function to be achieved by a processing device such as a computer or a dedicated processor.

DETAILED DESCRIPTION OF A PREFERRED EMBODIMENT

Embodiment 1 of the Invention

Figure 1:
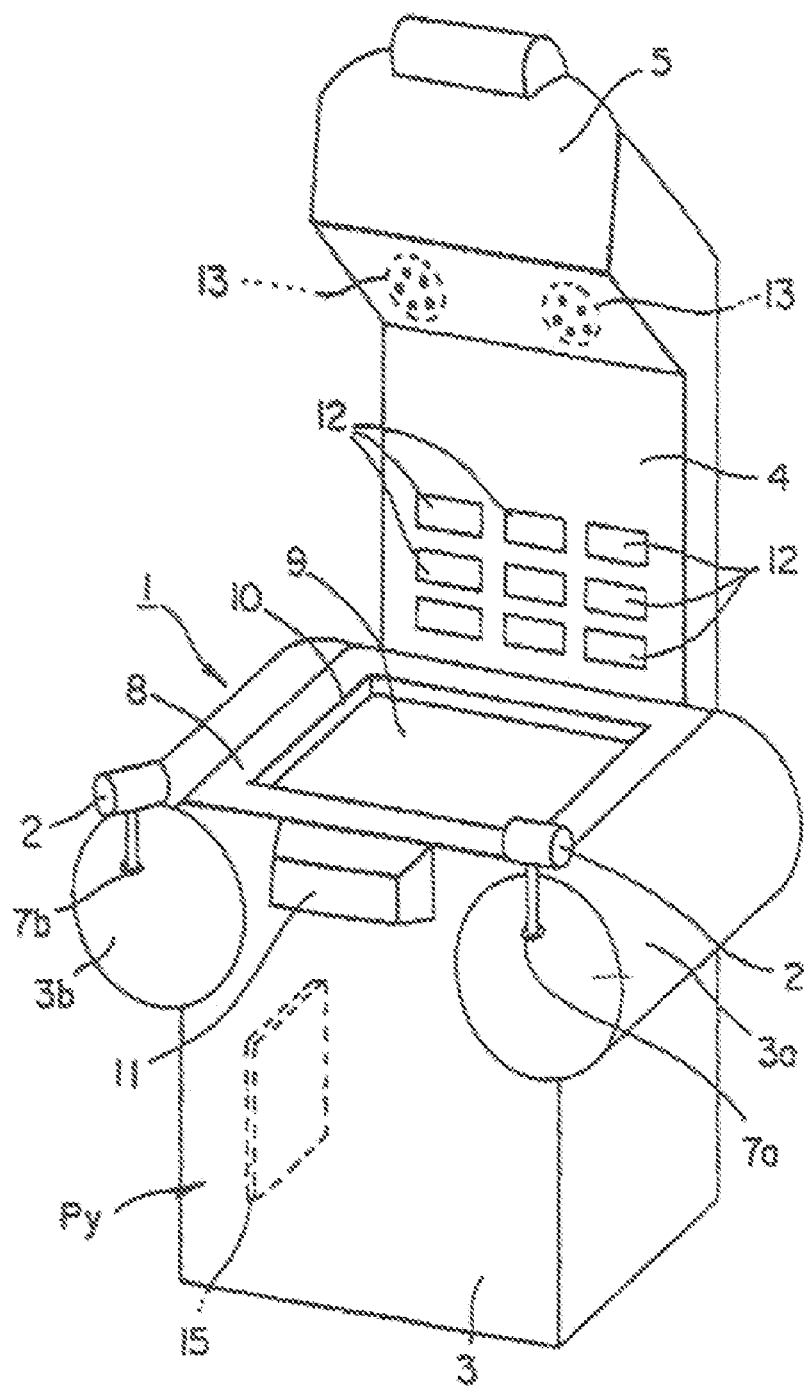
FIG. 1 is an perspective view depicting the image processing device and input device pertaining to the present invention.

Embodiments of the present invention are described below with reference to examples depicted in the attached drawings. FIG. 1 is a perspective view depicting an image processing device and an device pertaining to the present invention. Reference 1 refers to the game device main unit, and reference 2 refers to input devices in the form of hammers (input devices). The game device main unit 1 comprises a trapezoidal case unit 3, a display board 4 standing upright from the surface of the case unit 3, and a box 5 located above the display board 4.

Cylindrical bodies 3*a* and 3*b* are provided for the sake of design at the top on either side of the case unit 3. The cylindrical bodies 3*a* and 3*b* are equipped with cylindrically notched housing components 7*a* and 7*b*. The handles of the hammers 2 can be housed in the housing components 7*a* and 7*b*.

Figure 2:
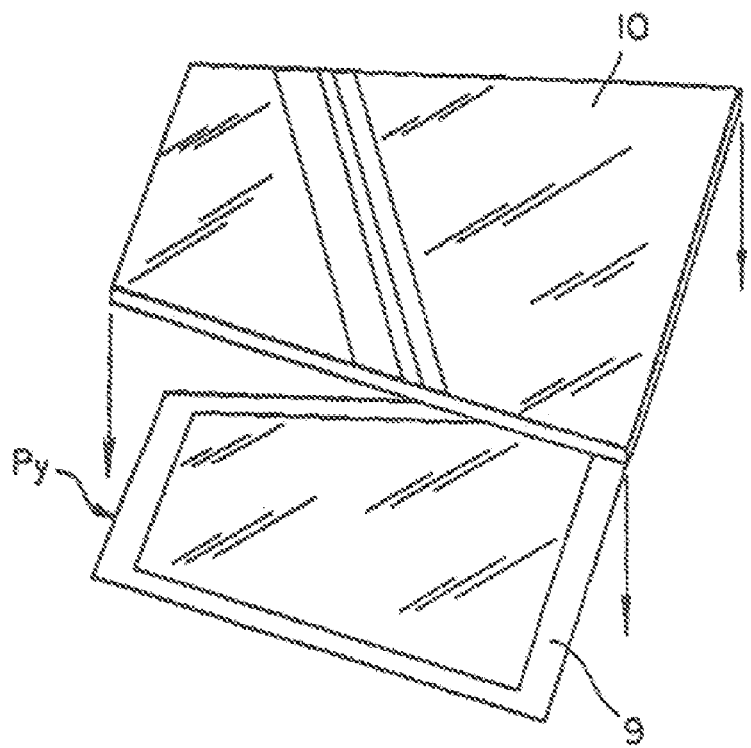
FIG. 2 is a perspective view depicting the relationship in which the display means and protective glass of the image processing device are arrange relative to each other.
Figure 3:
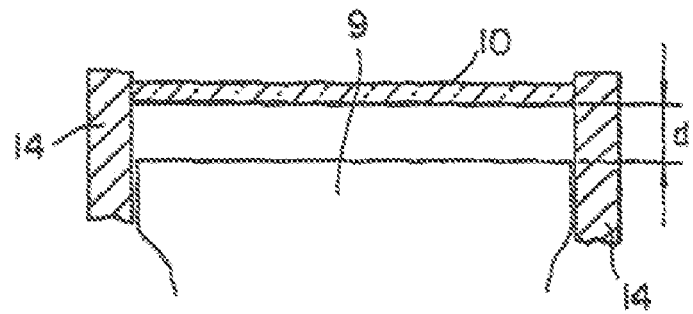
FIG. 3 is a cross section depicting the relationship in which the display means and protective glass of the image processing device are arranged relative to each other.

A top surface 8 of the case unit 3 is designed so as to tilt lower on the player side (side opposite the display board 4), making it more convenient, as described below, for the player to strike the protective glass 10 with the hammer. A CRT display or video projector 9 (hereinafter simply referred to as "display"), for example, is provided as the display means at the top surface 8. As shown in FIGS. 2 and 3, protective glass 10 is placed on the display 9. The protective glass 10 prevents the force of the impact from the hammer-type input device 2 from falling directly on the display 9. The protective glass is also considered the display means in the present invention. Ordinarily, as described below, the tip of the hammer is provided with a buffer means for the stress, such as a bellows made of resin. The protective glass is not an indispensable structural element in the present invention.

A conventional coin slot or other such device is provided in front under the display 9 (and protective glass 10). The coin slot or other such device 11 includes a coin slot for entering coins, a coin return slot for returning coins, a coin feed handling circuit that provides data processing board notice, as described below, that a coin or the like has been inserted.

Display panels 12 etc. comprising seven segments of light-emitting diodes or the like are located in the aforementioned display board 4 to display game results or other necessary related data. Speakers 13 are arranged at a prescribed distance from each other inside the box 5.

A data processing board 15 is provided inside the case unit 3 of the game device main unit 1. Examples of the main processes of the data processing board 15 include game start processing, image signal formation processing, sound signal formation processing, input signal processing, screen coordinate position calculation (specification) processing, and score display processing. The display 9, hammer-type input devices 2, speakers 13, display panels 12, and coin slot or other related device 11 are electrically connected by signal wires (not shown in the figure) to the data processing board 15.

The game device main unit 1 and the hammer-type input device 2 as described above, allow one or two players to hold a hammer 2 in their hands and use the hammer to strike moving objects such as mice (the objects to be struck) while watching the game screen displayed by the display 9 in a contest over the strikes such as the number of strikes or the time needed until the object is struck. The object should move in a way that cannot be anticipated or predicted by the player.

The layout of the aforementioned display and protective glass are illustrated in further detail in FIGS. 2 and 3. The display 9 is set up at an incline so that the player side Py of the screen on the display 9 is lower. The protective glass 10 is set up at a fixed distance d parallel to the display 9 over the screen on the display 9, and is supported and secured by a base 14. Since the display 9 and protective glass 10 are downwardly inclined toward the player side, the hand holding the hammer can easily reach the entire display, even when the display is relatively large. The incline is such that the normal line in the center of the display form an angle of preferably 3 to 20 degrees, more preferably 3 to 17 degrees, and even more preferably 5 to 15 degrees, with respect to the perpendicular direction.

Figure 4:
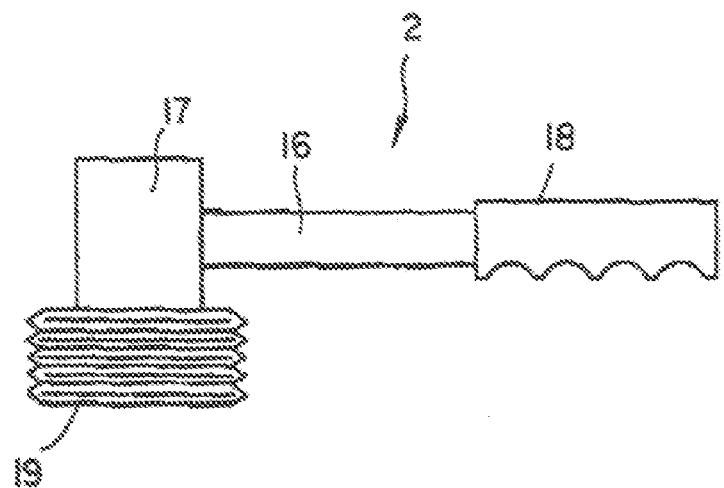
FIG. 4 is a side view depicting the appearance of an input device pertaining to the present invention.

The appearance and structure of the hammer-type input device 2 used in the image processing device are depicted by the side view in FIG. 4.

The input device 2 as a whole is in the form of a hammer, consisting of a bar-shaped handle 16 and a cylindrical head 17. The handle 16 is constructed in the form of a cylindrical bar with a flexible material. The head 17 is fixed at right angles to the tip of the handle 16, and a grip 18 is provided at the base. The tip of the head 17 is provided with a bellows as a buffer to soften the impact when the input device is brought into contact with the protective cover. Switch means and detection means, described below, may be housed in the handle 16, head 17, and buffer 19.

Figure 5:
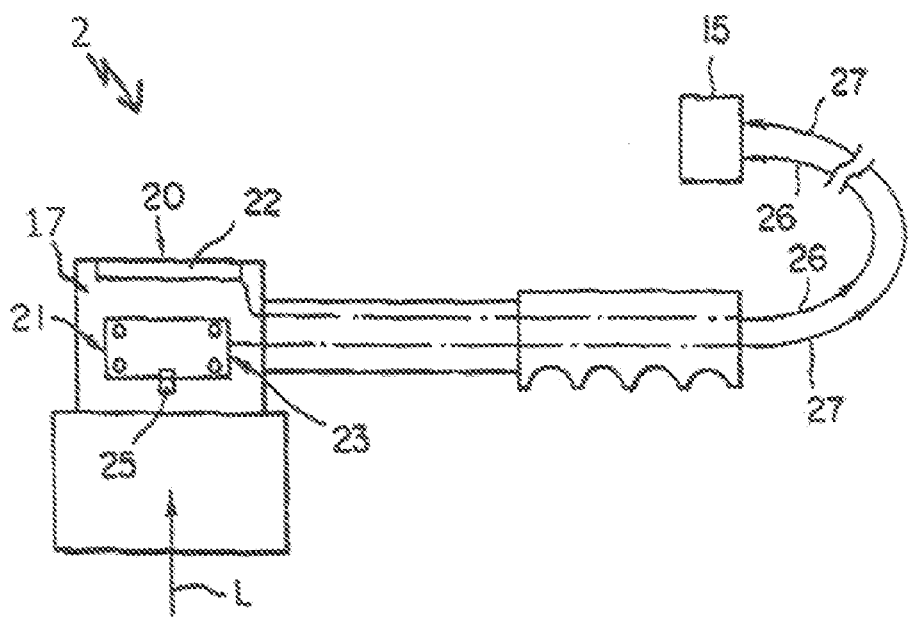
FIG. 5 is a cross section depicting the interior of the input device.

FIG. 5 is a cross section depicting the internal structure of the hammer-type input device. Switch means 20 housed in the hammer-type input device 2 outputs a trigger signal when the action of striking the protective glass 10 occurs. Here, the switch means 20 is provided in the form of a structure with a vibration switch 22 located in the head 17. When impact force of a certain level reaches a vibration sensor (described in detail below), the switch is turned off, for example, and the vibration switch 22 outputs an operating signal.

A detection means 21 housed in the hammer-type input device 2 is provided to obtain signals for computing which position on the display screen has been struck by the hammer. The detection means 21 is constructed of a photodetector substrate 23 provided in the interior of the head 17. The photodetector substrate 23 is described in detail below. In the photodetector substrate 23, light L from the scanning lines, which comes from below the bellows buffer 19 in the figure, is guided to a photoreceiver sensor 25, is converted to an electrical signal by the photoreceiver sensor 25, is then treatted to create a constant signal, and is output in the form of a photodetector signal. A photodiode, phototransistor, or the like may be used as the photodetector sensor 25. The operating switch of the vibration switch 22 and the output signal from the photodetector substrate 23 are fed to the data processing board 15 by signal lines 26 and 27, respectively.

Figure 6:
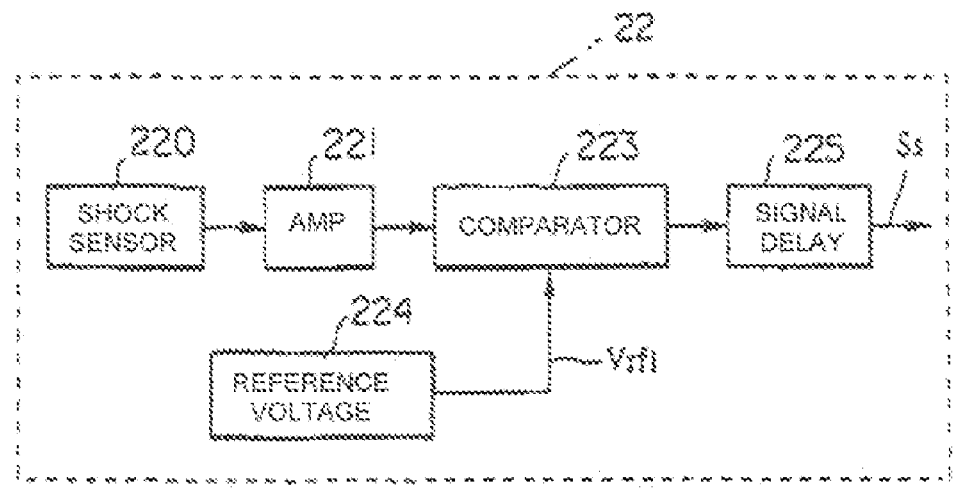
FIG. 6 is a block diagram depicting the structure of a vibration switch component used in the input device.

FIG. 6 is a block diagram depicting the structure of the vibration switch 22 in the hammer-type input device 2. The element constituting the vibration switch 22 is integrally constructed on a substrate. A shock sensor 220 is an element outputting an electrical signal corresponding to the impact force when impact occurs. The output of the shock sensor 220 is connected to an amplifier circuit 221, and the output signal of the shock sensor 220 is amplified by the amplifier circuit 221 to the prescribed level.

The output of the amplifier circuit 221 is connected to one input terminal of a comparator 223, so that the output signal can be applied to the one input terminal of the comparator 223. The reference voltage Vrf1 from a reference voltage feed circuit 224 is applied to the other input terminal of the comparator 223. The comparator 223 outputs a shock detection signal when the output voltage from the amplifier circuit 221 is greater than the aforementioned reference voltage Vrf1. The shock detection signal is managed in such a way as to allow the output of an operating signal Ss through the delay of a prescribed time for the adjustment of the processing time, for example, by a delay circuit 225.

Figure 7:
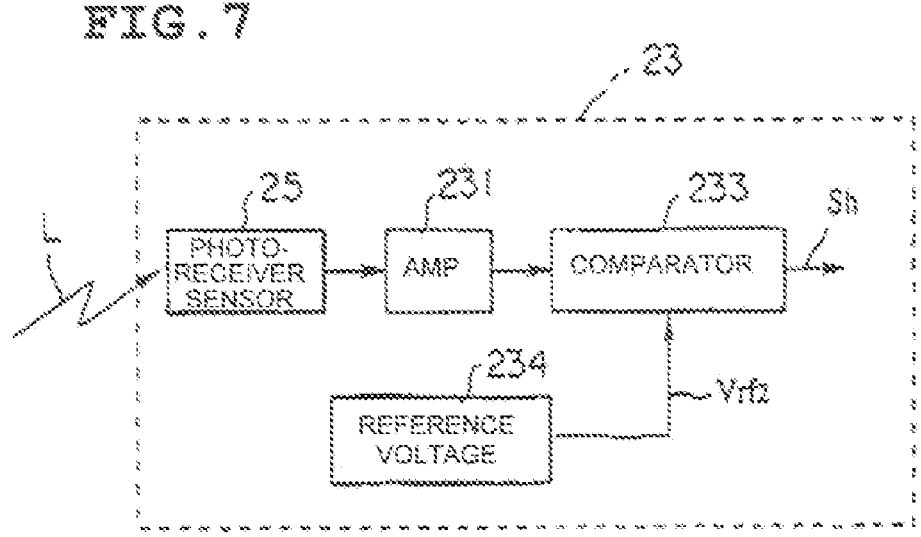
FIG. 7 is a block diagram depicting the structure of a photodetector substrate used in the input device.

FIG. 7 is a block diagram depicting the structure of the photodetector substrate 23 in the aforementioned hammer-type input device 2. In the figure, the photoreceiver sensor 25 is an element that detects the light L from the display 9 and converts it to an electrical signal. As described above, the photoreceiver sensor 25 may be constructed of a photodiode, phototransistor, or the like. The output of the photoreceiver sensor 25 is connected to an amplifier circuit 231, and the output signal from the photoreceiver sensor 25 is amplified by the amplifier circuit 231 to the prescribed level. The output from the amplifier circuit 231 is connected to one input terminal of a comparator 233, allowing the output signal to be applied to the one input terminal of the comparator 233. The reference voltage Vrf2 from a reference voltage feed circuit 234 is applied to the other input terminal of the comparator 233. The comparator 233 outputs a photodetector signal Sh when the output voltage from the amplifier circuit 231 is greater than the aforementioned reference voltage Vrf2.

Figure 8:
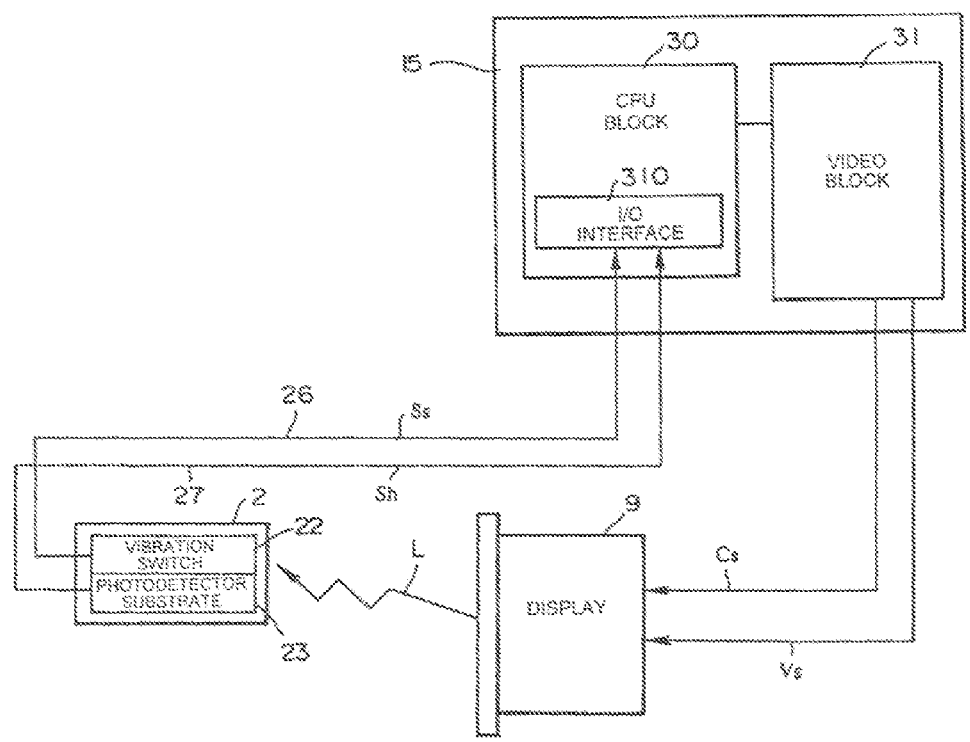
FIG. 8 is a block diagram depicting a schematic of the signal processing performed by the image processing device.

FIG. 8 is a block diagram depicting a schematic structure of the processing between part of the structure of the image processing device and the hammer-type input device in the present invention. In the figure, the vibration switch 22 inside the hammer-type input device 2 and the photodetector substrate 23 are connected through a signal line 26 and signal line 27, respectively, to the I/O interface 310 of a CPU block 30 in the data processing board 15. The data processing board 15 is described in the form of one consisting of the CPU block 30 and video block 31 in FIG. 8.

The CPU block 30 of the data processing board 15 runs the game according to a prescribed program, and specifies which position on the screen of the display 9 has been struck by the hammer-type input device 2 based on the photodetector signal from the photodetector substrate 23 when an operating signal from the vibration switch 22 is input, allowing this to be reflected in the contents of the game.

The video block 31 in the data processing board 15 sends the game image signals (video signal Vs and synchronizing signal Cs) prepared on the basis of the results processed by the board to the display 9. The data processing board 15 also gives data such as the score to the display panels 12 (see FIG. 1) and gives the prescribed sound signals to the speakers 13 in FIG. 1 (see FIG. 1). Processed images are thus displayed on the display 9, the necessary score or the like is displayed on the display panels 12 (see FIG. 1), and sounds are reproduced from the speakers 13 (see FIG. 1) according to the processing results.

Figure 9:
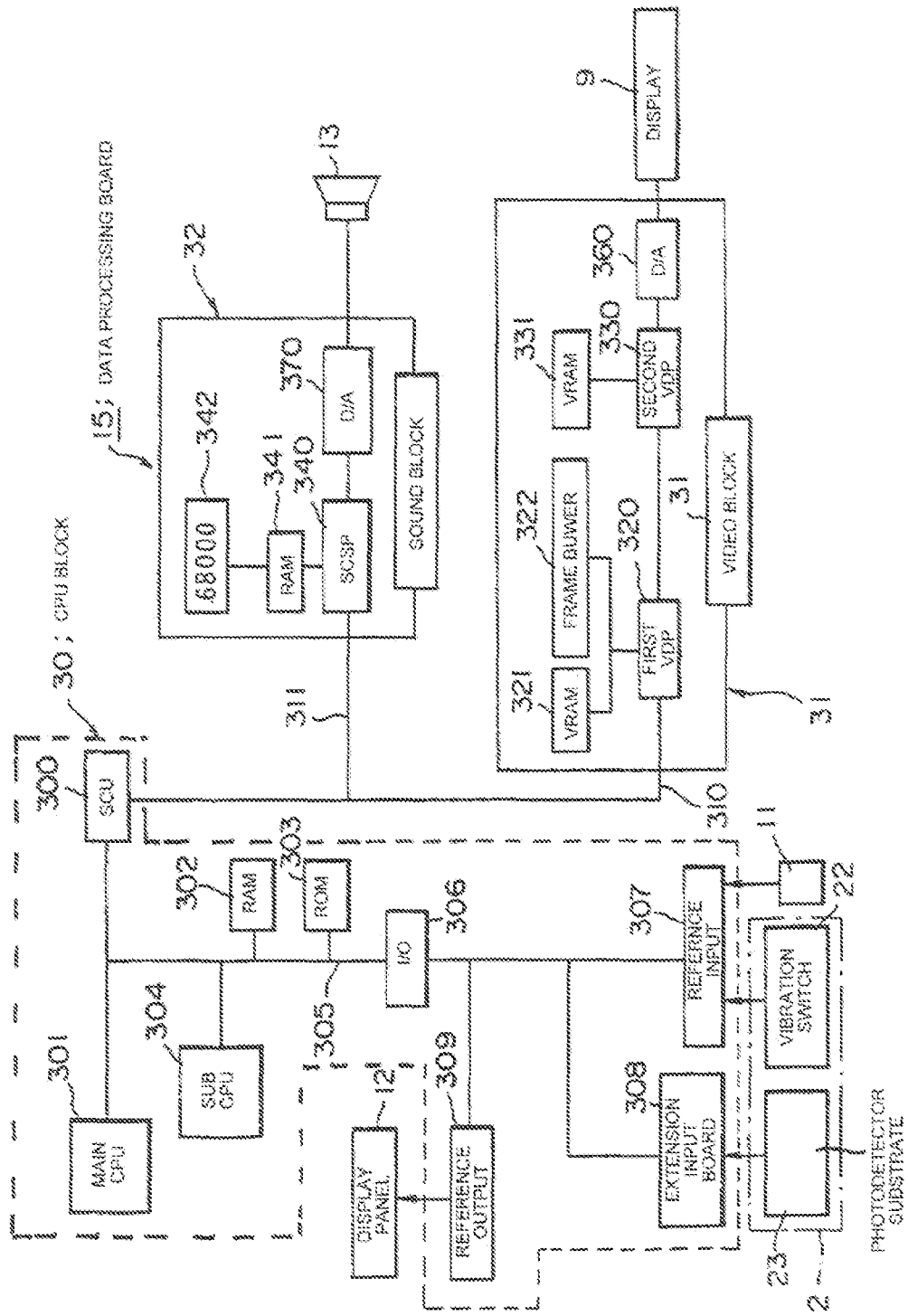
FIG. 9 is a block diagram depicting in detail the signal processing performed by the image processing device.

FIG. 9 is a block diagram depicting a detail of the image processing device. In the figure, the data processing board 15 is constructed of a CPU block 30 for controlling the entire device, a video block 31 for controlling display on the game screen, a sound block 32 for producing resulting sounds and the like, and other power source circuits or the like.

The CPU block 30 is constructed of a SCU (system control unit) 300, main CPU 301, RAM 302, ROM 303, subCPU 304, CPU bus 305, input-output circuit block 306, reference input board 307, extension input board 308, reference output board 309, and the like. The main CPU 301 controls the entire device. The main CPU 301 has the same computing function as a DSP (digital signal processor) inside, and can execute application software at high speeds.

The RAM 302 is used as a work area for the main CPU 301. An initialization program for initializing processing, a processing program for the entire game, and the like are written to the ROM 303. The SCU 300 ensures the smooth input and output of data between the main CPU 301, a first (video display processor (VDP) 320, a second VDP 330 1 (320), VDP 2 (330), SCSP 340, and the like by controlling the buses 305, 310, and 311.

The SCU 300 is equipped with a DMA controller inside, and can send character data in the game to the VRAM 321 in the video block 31. Application software for the game and the like can thus be executed at high speed. The subCPU 304 collects operating signals from the hammer-type input device 2 connected to the reference input board 307 and photodetector signals from the hammer-type input device 2 connected to the extension input board 308 according to commands from the main CPU 301, determines the position of the hammer-type input device 2 on the screen, and gives the necessary score from the reference input board 307 to the display panels 12. The subCPU 304 thus controls peripheral devices.

The main CPU 301 controls images related to characters (including the object) in the game screen, for example, based on operating data received from the subCPU 304. The video block 31 is equipped with a first VDP 320 for visualizing a two-dimensional sprite screen in which characters are primarily superimposed over other background images, and a second VDP 330 for visualizing scroll background screens, synthesizing images with sprite image data and scroll image data, clipping, and the like. Here, characters may also be composed of three-dimensional data involving the synthesis of a plurality of polygons instead of sprites.

The first VDP 320 houses a system register, and is connected to VRAM (DRAM) 321 and a two-sided frame buffer 322. The game character image data is sent from the main CPU 301 through the SCU 300 to the first VDP 320, and is written to VRAM 321. The image data written to VRAM 321 is visualized, for example, in the visualizing frame buffer 322 in an 8-bit/pixel format. The visualized frame buffer 322 data is sent to the second VDP 330 during display mode.

The data for controlling visualization is set from the main CPU 301 through the SCU 300 to the system register of the first VDP 320. The first VDP 320 controls visualization and display according to commands set by the system register.

The second VDP 330, meanwhile, houses a register and color RAM, and is connected to VRAM 331. The second VDP 330 is also connected through the bus 307 to the first VDP 320 and SCU 300, and is connected through a D/A convertor 360 to the display 9.

The scroll image data for the second VDP 330 is defined from the main CPU 301 through the SCU 300 to VRAM 331 and color RAM (not shown). Data for controlling the image display is similarly established in the register of the second VDP 330. Data defined at VRAM 331 is read out by the second VDP 330 according to the contents defined in the register, and is converted to scroll screen image data showing the background for the characters. The display priority of the image data sent from the scroll screen image data and first VDP 320 is determined according to the definitions in the register, resulting in synthesis into the final display image data.

When the display image data is in palette format, the color data defined in color RAM is read out according to value by the second VDP 330, and the display color data is thus produced. When the display image data is in RGB format, the display image data serves as the display color data without modification. The display color data is output to the D/A converter 360. The D/A converter 360 produces image signals by adding synchronizing signals to the image data for output to the display 9. Game images are thus displayed on the display 9.

The sound block 32 is equipped with a DSP 342 for synthesizing voice according to PCM or FM format, and an SCSP 340 for controlling the DSP 342 or the like. The voice data produced by the SCSP 340 is converted to voice signals by the D/A converter 370, which are then output to the speakers 13.

The operation of the image processing device is described below with reference to FIGS. 10 through 13 based on FIGS. 1 through 9. First, the overall flow of operations is described using the main flow chart in FIG. 10 and the illustration of the game selection screen in FIG. 11. When a coin is inserted into a coin slot or other related device 11 (step 501 in FIG. 10), the main CPU 301 is notified of this through the subCPU 304. The main CPU 301 produces a short and simple opening demonstration, and gives the data to the first VDP 320 and SCSP 340 through the SCU 300 (step 502). The first VDP 320 thus produces the opening demonstration images and gives them to the display 9. The prescribed demonstration is thus displayed on the display 9. The necessary sound data is produced by the SCSP 340 and is given to the D/A converter 370. The D/A converter 370 converts and outputs analog signals to the speakers 13.

Figure 11:
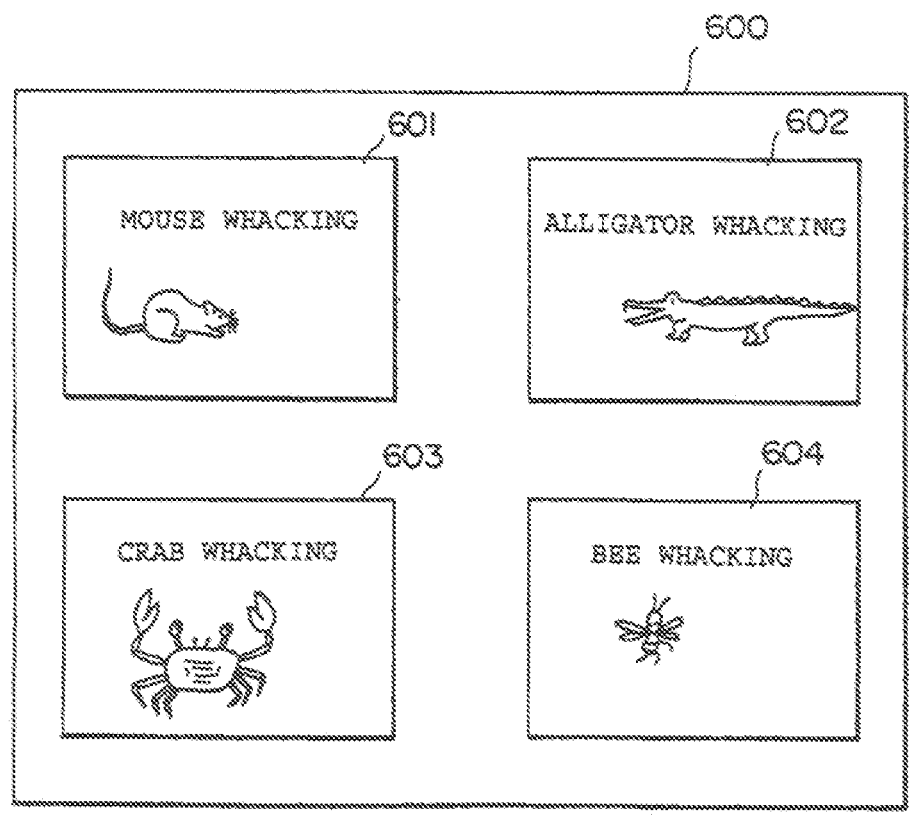
FIG. 11 is an illustration of a game selection guidance image in the main processing operations of the image processing device.

When the demonstration is completed, the main CPU 301 then sends the data for producing the game selection screen through the SCU 300 to the first VDP 320 (step 503). Four screens, for example, are thus produced by the first VDP 320 and are given to the D/A convertor 360. The image signals from the D/A convertor 360 are given to the display 9. A guide screen 600 giving a selection of four game modes 601, 602, 603, and 604, as shown in FIG. 11, for example, is displayed on the display 9. The four game modes 601, 602, 603, and 604 are provided so as to allow objects with different behavior to be selected, where, for example, the symbol 601 is "mouse-whacking," 602 is "alligator-whacking," 603 is "crab-whacking," and 604 is "bee-whacking."

Here, when the player selects one game from the guide screen 601 (step 503), the selected game is executed by the main CPU 301, allowing the player to play the game while watching the display 9 (step 504). When the game is over, the main CPU 301 determines whether the game has been cleared (step 505). When it has been determined by the main CPU 301 that the game has been cleared (step 505: YES), a "cleared" demonstration image is produced, and is sent through the SCU 300 to the first VDP 320 and SCSP 340 (step 506). The "cleared" demonstration image signals are thus formed by the video block 31, and the "cleared" demonstration sound signals are formed by the sound block 32. The display 9 displays the images via the image signals. The "cleared" demonstration sound signals are reproduced as sound from the speakers 13. By concluding the "cleared" demonstration process, the main CPU 301 produces "game over" images, which are sent through the SCU 300 to the first VDP 320 and SCSP 340 (step 607). The "game over"

images are thus provided on the display 9, and sounds indicating that the game is over are provided by the speakers 13.

When it is determined by the main CPU 301 that the game is not cleared (step 505: NO), meanwhile, "not cleared" demonstration images are produced, and are sent through the SCU 300 to the first VDP 320 and SCSP 340 (step 508). "Not cleared" demonstration image signals are thus formed by the video block 31, and "not cleared" demonstration sound signals are formed by the sound block 32. The image signals are converted into images by the display 9. The "not cleared" demonstration sound signals are reproduced in the form of sound from the speakers 13. By concluding the "not cleared" demonstration process, the main CPU 301 produces "game over" images and sends them through the SCU 300 to the first VDP 320 and SCSP 340 (step 506). Images indicating that the game is over are thus provided on the display 9, and sounds indicating that the game is over are provided by the speakers 13.

Here, in the course of game play (step 503), an object in the form of a mouse, for example (the object to be truck, hereinafter referred to as "object"), appears and disappears on the screen of the display 9. When the object appears, the player uses the hammer-type input device 2 to strike the object on the screen of the display 9. At this time, the subCPU 304 executes the process for receiving the operating signal Ss and photodetector signal Sh from the hammer-type input device 2 (see FIG. 8) or for outputting output signals to display the score.

Figure 12:
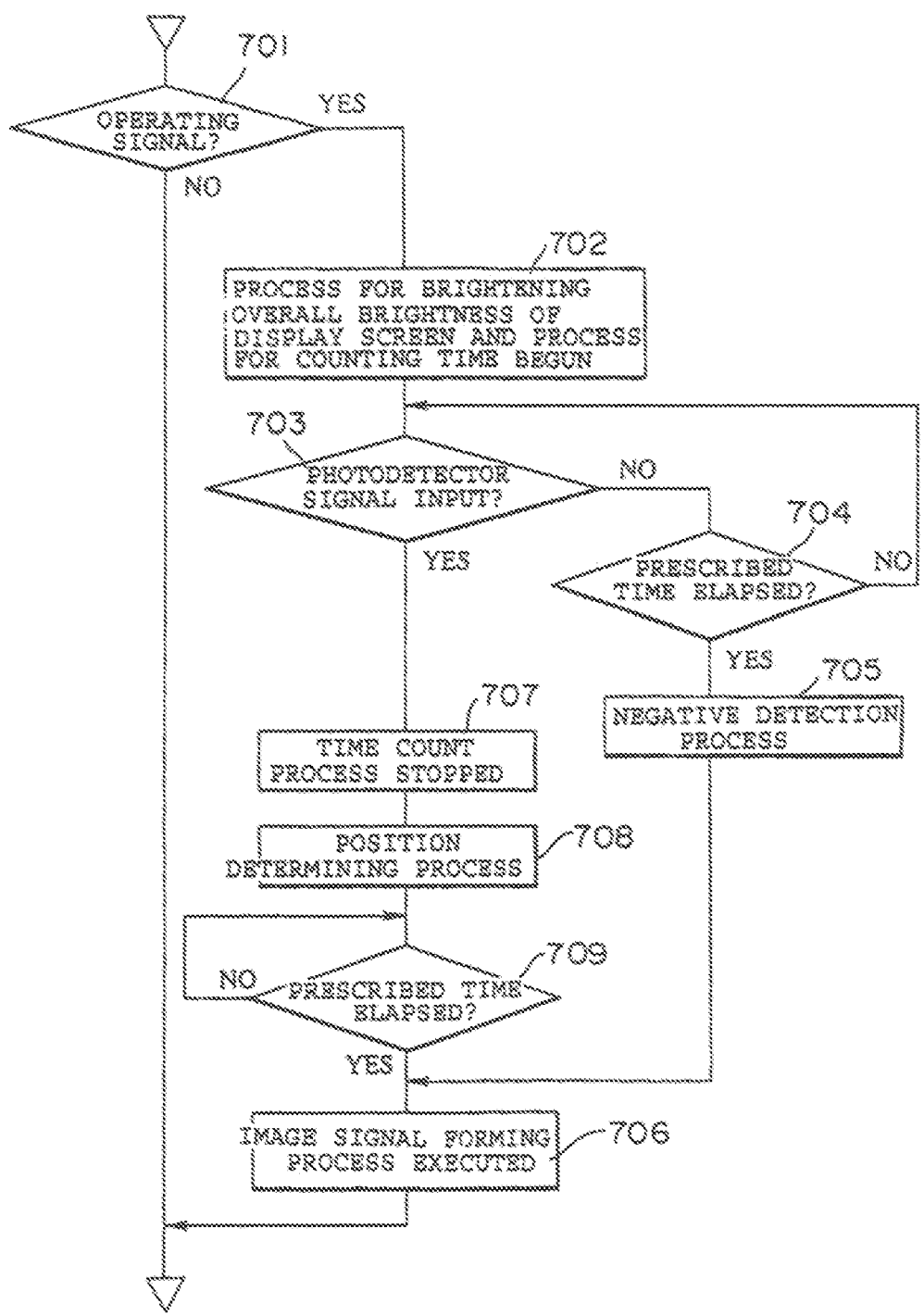
FIG. 12 is a flow chart for determining the position of the input device on the surface of the display means in the image processing device.
Figure 13:
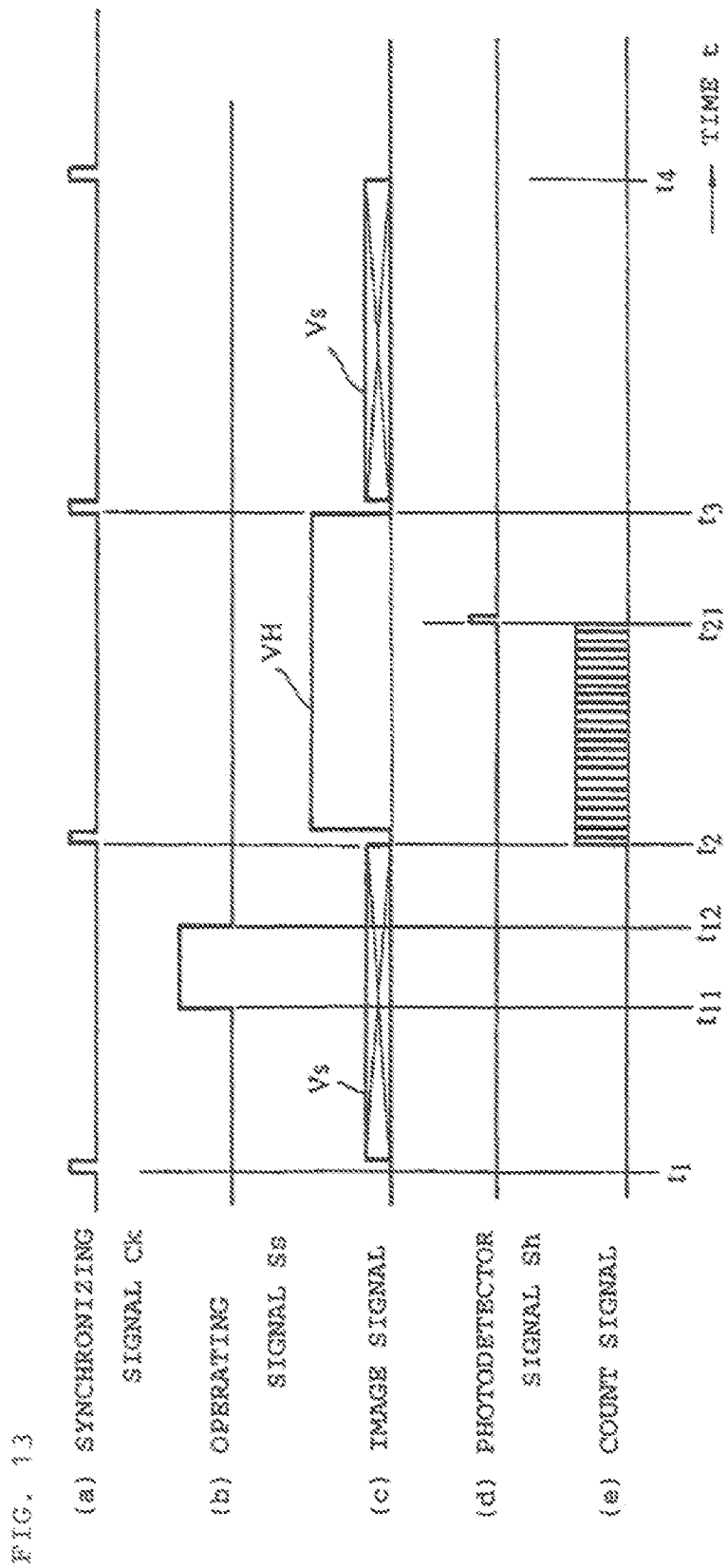
FIG. 13 is a timing chart of the position determining operations provided by the image processing device.

Here, the hammer-type input device 2 strikes the protective glass 10. As such, the vibration switch 22 of the switch means 20 in the hammer-type input device 2 is activated and outputs an operating signal Ss. At this time, the subCPU 304 receives the signal Ss, and the main CPU 301 is notified. The main CPU 301 executes the image position-specifying operations. These image position-specifying operations are described with reference to FIGS. 12 and 13. Here, FIG. 12 is a flow chart of the position-determining operations in the image processing device. FIG. 13 is a timing chart that shows signal changes that occur during the position-determining operations in the image processing device. In FIG. 13, the horizontal axis indicates time. Synchronizing Signal Timing chart 1302 depicts a synchronizing signal Ck which rises every 1/60 (second) for television display, operating Signal Timing chart 1304 depicts an operating signal Ss from a hammer-type input device 2, Image Signal Timing chart 1306 depicts an image signal Vs sent to the display 9, photodetector Signal Timing chart 1308 depicts a detection signal Sh from the hammer-type input device 2, Count Signal Timing chart 1310 depicts the measuring time for specifying the screen position.

In the video block 31, the synchronizing signal is produced in the form of a pulse every 1/60 (seconds), resulting in times t1, t2, t3, etc., as shown in Synchronizing Signal Timing chart 1302. As shown in Image Signal Timing chart 1306 image signal Vs is formed every 1/60 (second) synchronously with the synchronizing signal by the video block 31, and is sent through the D/A convertor 360 to the display 9.

Figure 10:
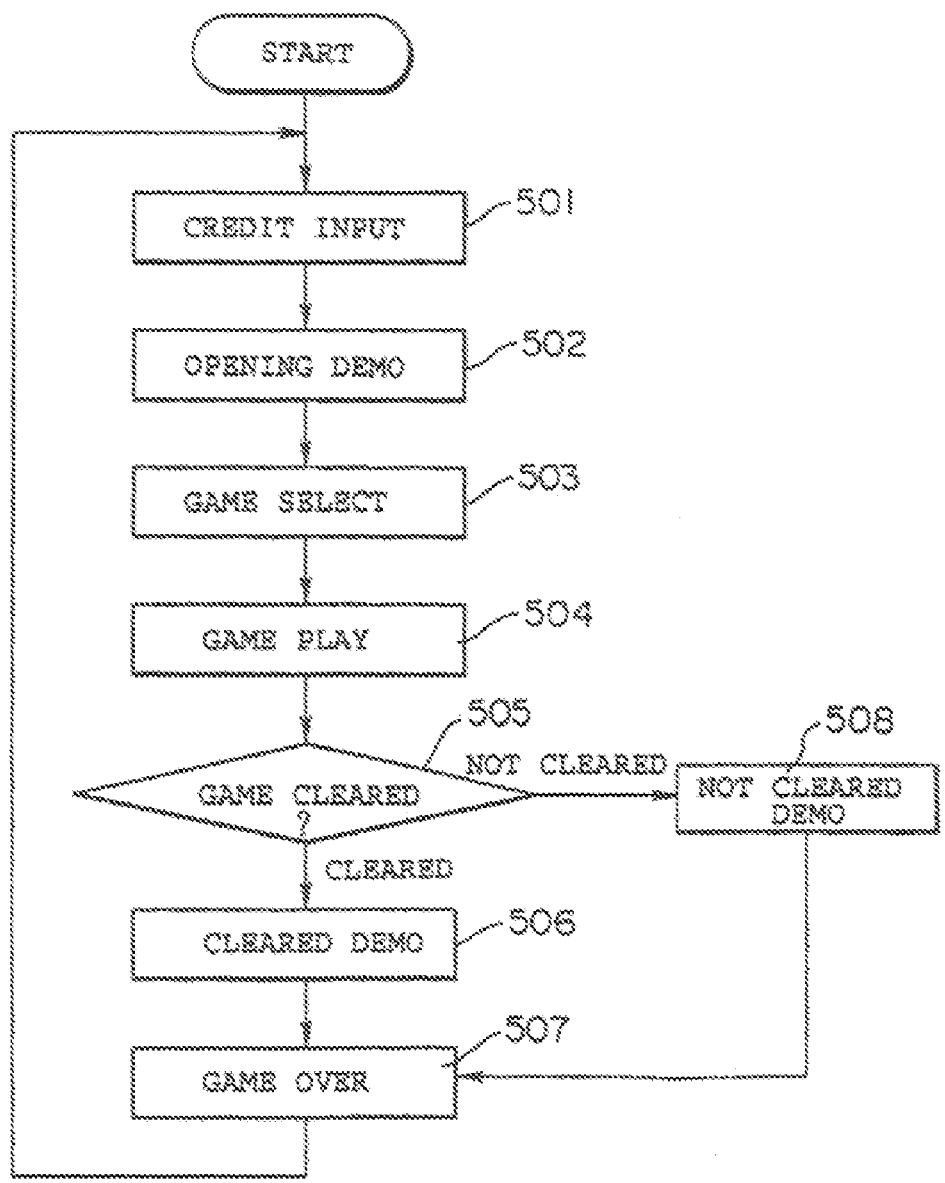
FIG. 10 is a flow chart illustrating the main processing operations of the processing device.

The game is now displayed on the display 9 and is in play (step 504 in FIG. 10). The subCPU 304 executes the process for receiving operating signals Ss from the hammer-type input device 2 (step 701 in FIG. 12). When the player holds the hammer-type input device 2 but does not operate it, no operating signals Ss are output from the hammer-type input device 2, so the subCPU 304 determines that no operating signal Ss is being detected (step 701: NO) and moves on to another process. The subCPU 304 executes step 701 in cycles. That is, the subCPU 304 nearly always monitors the reference input board 307 to detect whether or not an operating signal Ss has been input from the hammer-type input device 2.

Here, during game play, the player uses the hammer-type input device 2 to strike prescribed positions on the display 9 screen. The vibration switch 22 of the switch means 20 in the hammer-type input device 2 detects impact, and an operating signal Ss is output from the vibration switch 22 during the period of time t11 through t12 shown in Operator Signal Timing Chart 1304. The subCPU 304 detects that the operating signal Ss has been input (step 701: YES), and the main CPU 301 is notified that the operating signal Ss has been input.

The main CPU 301 begins the processing needed to obtain the point of contact. Specifically, a command to brighten the entire screen of the display 9 is input by the main CPU 301 through the SCU 300 to the video block 31 so as to increase the brightness of the entire screen of the display 9 from the subsequent vertical synchronizing signal (time t2 in FIG. 13) in the first VDP 320 and second VDP 330, and the time is counted from the vertical synchronizing signal (t2) (step 702). The time is counted so as to obtain data relating to the aforementioned scanning line position (scanning point position) based on the vertical synchronizing signal.

In the video block 31, to obtain the photodetector signal Sh described below from the point in time at which the subsequent vertical synchronizing signal was input, such as the time t2 in Image Signal Timing Chart 1306, a high-brightness image signal is formed and is given to the display 9 while scanned. Image signals to increase the brightness are continuously output from this timing to the subsequent timing (time t2 to t3).

The main CPU 301 then waits for notification as to whether a photodetector output signal has been input from the subCPU 304 (step 703: NO). In other words, in the absence of any notification that a photodetector signal from the subCPU 304 has been detected (step 703: NO), the main CPU 301 determines whether 1/60 (second) has elapsed from time t2 (step 704). When the main CPU 301 has determined that 1/60 (second) has not elapsed since time t2 (step 704: NO), it then determines whether or not there is any notification that a photodetector signal from the subCPU has been detected (step 703).

Here, it is assumed that no notification of the detection of a photodetector signal has been sent from the subCPU 304 to the main CPU 301. At that time, when the main CPU 301 determines that 1/60 (second) has elapsed since time t2 (step 704: YES), it determines that the detection is negative (step 705). The main CPU 301 moves to the original game processing (step 706). The image signals are thus the image signals accompanying ordinary game processing from time t3 and thereafter, as shown in Image Signal Chart 1306.

Meanwhile, at time t21 in Photodetector Signal Timing Chart 1308 notified by the subCPU 304 that a photodetector signal has been detected (step 703: YES). The main CPU 301 counts the time to specify the screen position of the hammer-type input device 2 striking the screen of the display 9 by the timing of the time t2 of the synchronizing signal (see Count Signal Timing Chart 1310, step 707). That is, time is counted from the time (t2) of the beginning of scanning to the time (t21) when a bright light is detected through the scanning lines. This time is the data relating to the position of the scanning lines obtained on the basis of the vertical synchronizing signal.

When the time count is completed (step 707), the position at which the scanning lines run per scan timing is learned, and the coordinate position on the display screen struck by the hammer-type input device 2 is computed based on the counted time (step 708). That is, a screen component of the image displayed on the display 9 is roughly constructed of a period from one synchronizing signal to the next synchronizing signal. As such, the time elapsed from the synchronizing signal has a one-to-one correspondence to positions on the display 9 screen. The position on the display 9 screen can thus be specified by determining the time elapsed from the synchronizing signal.

When the position computation is completed, the main CPU 301 waits until 1/60 (second) has passed from time t2 (step 709: NO), and moves to the original game processing at time t3 and thereafter (step 706). The image signals are thus the signals accompanying ordinary game processing at time t3 and thereafter, as shown in Image Signal Timing Chart 1306.

The main CPU 301 thus determines which position on the display 9 screen has been struck by the hammer head 17 of the hammer-type input device 2. The main CPU 301 then determines if the object has been properly struck, that is, whether or not a certain type of collision has successfully occurred between the hammer and object, on the basis of the determined results. This is referred to as collision determination below for the sake of convenience. It is ultimately determined whether or not the position of the hammer head 17 on the display 9 screen falls within the object region displayed on the display 9.

The affirmation of collision determination results in image processing corresponding to the successful collision, that is, an image such as the disappearance of the object is given to the player. A model of the collision determination with respect to the object is usually given to accelerate and simplify collision determination in this collision determination. A rectangular model is usually given, where the center of the rectangle is modeled as the center of the object, and successful collision is determined on the basis of whether or not the position on the screen struck by the hammer is within the rectangular model frame. Naturally, the collision is determined to be successful if the struck position is within the rectangular model frame. The degree of difficulty for achieving a successful strike can be adjusted by selecting a rectangular model of a desired size. The probability of striking a position within the frame is greater with larger rectangular frames than with smaller rectangular frames, and the game difficulty can be lowered. The smaller the rectangular frame, the lower the probability of a successful collision and the greater the game difficulty. The collision determination here is rapidly processed by the subCPU 304, and the main CPU 301 rapidly executes the necessary image processing while using the determined results.

In the embodiment of the invention described above, the time was counted with the aforementioned vertical synchronizing signal as the starting point so as to obtain data relating to the position of the scanning lines based on the vertical synchronizing signal, but the following structure can also be adopted. H (horizontal) and V (vertical) counters are usually provided in ordinary video game devices to learn the current scanning points. When the counter values are used, and these values are recorded in a latch register or the like when a photodetector signal has been detected, data relating to the scanning line position based on the vertical synchronizing signal can be obtained.

The H counter counts up every time the CRT display scanning points move once in the horizontal direction, and is set by the horizontal synchronizing signal. The V counter counts up per horizontal synchronizing signal every time the scanning lines move once in the vertical direction, and is set by the vertical synchronizing signal. That is, the counter values constantly indicate the scanning line position on the display screen. These counter values are recorded in the register when a photodetector signal has been input. Data related to the scanning line position based on the horizontal synchronizing signal is thus recorded in the register. The CPU 301 reads the register values, and on that basis may compute the coordinate position on the display 9 screen.

This game device has the following advantages. The object that is struck is not mechanical but is provided by images, allowing for greater freedom and fewer restrictions on the selection and design of the shape and behavior of the struck object. Images of the struck object, the background, or the like are created by software, so a plurality of games may be provided for the player with just one game set, for example. Since there is no need to endow the struck object with mechanical durability, the cost can be lowered. The program of the game device described here can be used with household game devices using a recording medium such as a CD-ROM or ROM cassette.

As described above, in the first embodiment of the invention, the movement of the object is realized by an image processing means, and the prescribed processing is managed on the basis of contact data by an input means to a display means where the moving object is displayed, so it is possible to give the object a variety of shapes and movements while providing object movement that is not dependent on a mechanical structure, and it is also possible to provide input based on contact, such as "whacking," to the object, and to execute the prescribed image processing based on this input.

In particular, a prescribed relationship between the region where the object is and the point of contact where the input device is brought into contact with the display means, such as whether or not the point of contact is in the region where the object is (whether or not a certain type of collision has occurred between the two), is determined. Thus, even though the object is provided by image processing, a player or operator can still be provided with a state as to whether or not the object has been successfully "whacked." The game device pertaining to the present invention thus allows scored games to be played by means of this determination.

The display means is provided with a protective cover, allowing the durability of the display means to be improved. This also affords a display means allowing the input means to be brought into direct contact while protecting the display.

The normal line of the image display surface of the display means forms an angle ranging from 3 to 17 degrees with respect to the vertical direction, thereby making it relatively easier to bring the input device into contact with the display means.

The input device is equipped with a switch means enabling the output of contact data when brought into contact with the display means, thereby preventing the unintentional output of data when no contact has been made. A vibration switch successfully ensures this.

The apparatus in the first embodiment of the present invention can also be constructed in such a way as to be equipped with a photoreceiver means for light emitted from the scanning lines of the CRT display serving as the display means, wherein a position computing means begins a process necessary for obtaining points of contact based on the output from the switch means, data on the scanning points obtained on the basis of scanning synchronizing signals is accepted when a detection signal is input from the photoreceiver means, and the point of contact can be computed on the basis of this data, allowing the point of contact to be accurately and rapidly computed.

The input means is equipped with a buffer for softening the impact during contact at the location of contact with the display means, so as to improve the durability of the input means and display means.

Embodiment 2 of the Invention

Figure 14:
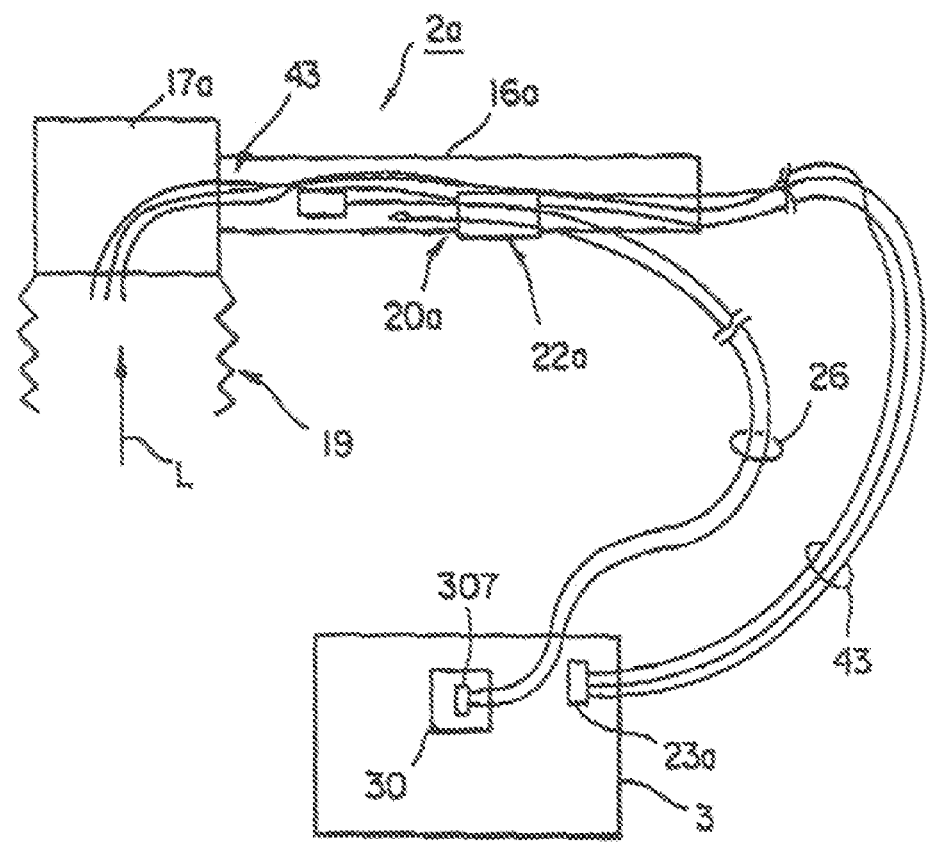
FIG. 14 is a schematic depicting a second embodiment of the input device.
Figure 15:
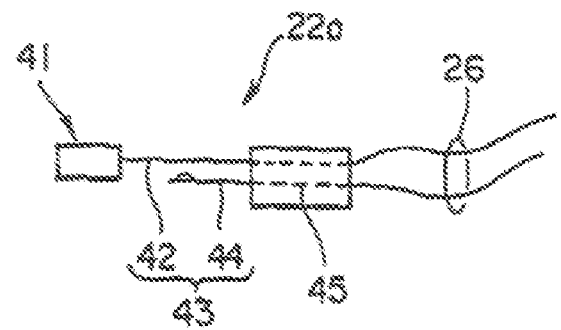
FIG. 15 is a schematic depicting a structural example of a vibration switch used in the input device.

FIG. 14 depicts a second embodiment, in which an input device of the present invention is described in further detail. FIG. 15 is a schematic depicting an example of the structure of a vibration switch 22a housed in a hammer-type input device 2a of FIG. 14.

The hammer-type input device 2a comprises a switch means 20a which outputs an operating signal when the input device collides, and an optical guide means (optical fiber) 43 for guiding light obtained from the aforementioned display 9 to a photodetector substrate 23a (exactly same structure as that of photodetector substrate 23 in FIG. 6) for obtaining a signal to specify the position on the display 9 screen. The hammer-type input device 2a is also provided with a handle 16a and hammer head 17a in the same manner as the hammer-type input device described above. The hammer head 17a is constructed in cylindrical form, with an opening provided at one end of this cylinder. A buffer 19 in the form of a cylindrical bellows is secured to the opening. Optic fiber 43 is supported and fixed while extending inside the handle 16a and head 17a toward the opening of the hammer head 17a, and the tip of the optic fiber terminates facing the open end of the buffer material around the base end of the buffer material 19.

The base end of the optic fiber 43 is connected to the photoreceiver sensor of the photodetector substrate 23a in the case unit 3. In the hammer described here, light coming from the opening of the hammer head 17a is guided through the optic fiber 43 to the photoreceiver sensor of the photodetector substrate 23a.

The switch means 20a housed inside the hammer-type input device 2a is composed of a vibration switch 22a provided inside the handle 16a, for example, as shown in FIG. 15. The vibration switch 22a is provided with an automatic reciprocating-type a contact which consists of a weight 41 having a specific weight, a contact 42 that flexes according to the moment acting on the weight during contact, and a fixed contact 44. Switch mechanism 43 includes contacts 42 and 44.

When a certain level of impact force acts on the hammer head 17a, the flexible contact 42 bends down until in contact with the fixed contact 44, the switch 22a closes, and the flexible contact 42 then automatically returns to the position shown in FIG. 15.

The base 45 is formed of an insulating material and supports that contacts while keeping them apart. The base 45 is fixed inside the handle 16a. The signals from the switch mechanism 43 are input through a signal line 26 to the reference input board 307 of the CPU block 30.

In this hammer-type input device 2a, the photodetector substrate 23a is not housed inside the handle 16a or hammer head 17a but is located in the case unit side, so the durability of the photodetector substrate 23A can be improved, and erroneous photodetection potentially caused by direct impact or the like to the photodetector substrate 23A can also be avoided.

Embodiment 3 of the Invention

Figure 16:
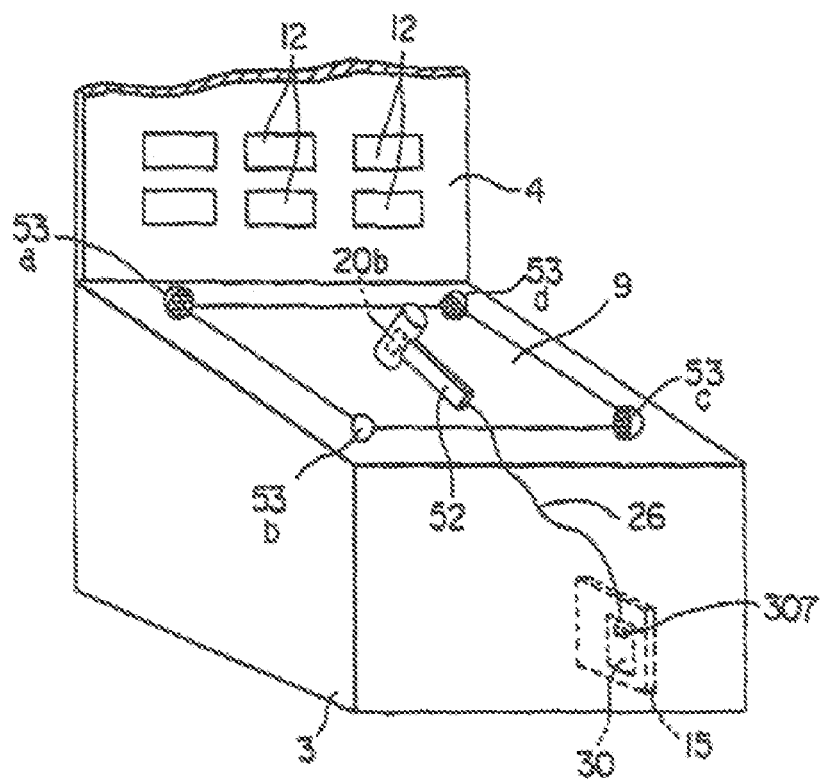
FIG. 16 is a schematic depicting a third embodiment of the input device.

FIG. 16 is an perspective view depicting another embodiment of the present invention. The input device 2b in this embodiment is a sound detector type rather than the photodetector type described above. The input device 2b consists of a hammer 52 housing a switch means 20b, and sound detector means (microphones) 53a through 53d located at the four corners of the display 9. The switch means 20b is connected to the reference input board 307 of the CPU block 30.

The microphones 53a through 53d located in the four corners are connected to the reference input board 307 of the CPU block 30 through four sound processing devices not shown in the figure.

Here, when the protective glass 10 not shown on the screen of the display 9 is struck with the hammer 52, resulting sound is produced by the compression of the bellows caused by the impact. The sound is captured by the microphones 53a through 53d. The sound signals output from the microphones 53a through 53d are given through the sound processing devices (not shown in figure), reference input board 307, and subCPU 304 to the main CPU 301. The main CPU 301 executes position computations for specifying the position on the screen based on the sound signals from the aforementioned sound processing devices when an operating signal Ss has been input from the switch 20b in the aforementioned input device 2b. Coordinate positions on the screen can thus be specified.

Figure 17:
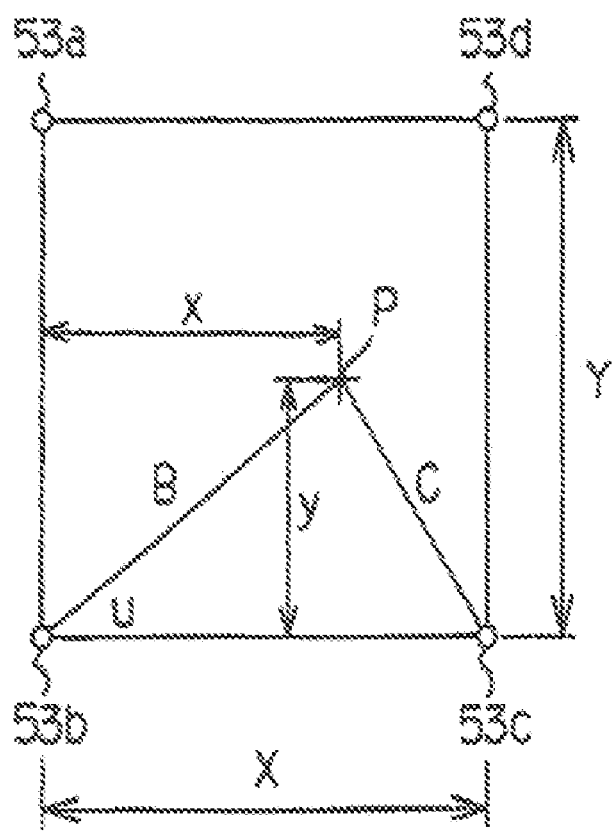
FIG. 17 is an illustration of the operation of the third embodiment of the input device.

This position computing by the main CPU 301 is described in detail based on FIG. 17.

As shown in FIG. 17, X is the distance between microphones 53a and 53d as well as between 53b and 53c, while Y is the distance between microphones 53a and 53b as well as 53d and 53c. When the hammer 52 has struck a point P, the coordinate position on the screen can be specified by determining the coordinates (x,y) at point P. The location of microphone 53b is the point of origin (the point of origin may be another position such as 53a). The distances between point P and points 53a, 53b, 53c and 53c are A, B, C, and D, respectively (only B and C indicated in FIG. 17).

In FIG. 17, coordinates (x, y) are determined by the following equations. The equations are derived as follows.

For the x coordinate:

$$x=(B^2+X^2-C^2)/2X \quad (1)$$

or:

$$x=(A^2+X^2-D)/2X \quad (1')$$

For the y coordinate:

$$y=(C^2+Y^2-D^2)/2Y \quad (2)$$

or:

$$Y=(B^2+Y^2-A^2)/2Y \quad (2')$$

However, since X and Y can be known beforehand, they should be recorded in memory as parameters. The distances A, B, C, and D can be obtained by measuring the arrival time of the signal. The time at which the hammer 52 has struck can be known on the basis of the switch means 20b, and the sound can be measured on that basis, allowing it to be readily known how much time the sound has taken to reach the microphones 53a through 53d when struck. Here, the distances A, B, C, and D are as follows, where the times needed to reach the microphones 53a through 53d are tA, tB, tC, and tD, and the sound propagation rate on the protective glass 10 is S.

$$A=s \cdot tA,\ B=s \cdot tB,\ C=s \cdot tC,\ D=s \cdot tD \quad (3)$$

Times tA, tB, tC, and tD are measured as follows, for example. A signal from the switch means 20b triggers the time count, and the count is stopped when the microphones begin to out put sound signals. The counted results correspond to the arrival time. Because the measurements sometimes do not go very well depending on the acoustic waveform, the calculations are done with Equations 1 and 2 or 1' and 2' using data with stable output waveforms. Both sets may be used in calculations, and the mean of the two results may be used as the coordinates for point P.

The derivation of Equations 1 and 2 are described below.

In FIG. 17, the relation expressed by the following equation is obtained from the cosine rule for the triangle P-53b-53c, where u is the angle at point P-53b-53c.

$$C^2 = B^2 + X^2 - 2BX \cdot \cos u \quad (4)$$

From FIG. 17, it is clear that;

$$x = B \cdot \cos u \quad (5)$$

(5) is substituted into (4):

$$C^2 = B^2 + X^2 - 2 \times X \quad (4)$$

The following equation is thus obtained.

$$x = (B^2 + X^2 - C^2)/2X \quad (1)$$

The same is true for Equation (2).

Instead of determining the arrival times tA, tB, tC, and tD, the difference between arrival times, that is, (tA−tB), (tA−tC), (tA−tD), or the like may be determined, and point P may be determined on that basis. The difference in arrival times (tA−tB) means that the difference between the distance from microphone 53a and the distance from microphone 53b is s(tA−tB). The point set meeting these conditions describes a prescribed curve (hyperbola), where point P is at least on the curve. The same is true of (tA−tC), (tA−tD), etc. Accordingly, the intersection of these curves is point P.

In this method, there is no need to accurately determine if the hammer 52 has struck. Since the switch means 20b need only detect that the hammer 52 has struck, the detection mechanism is simple. For example, if the hammer 52 has struck when the microphones 53 have detected sound of at least a certain level, the switch means 20b is unnecessary. This is advantageous for actual measurement. Actual sound signals are complex, and it is difficult to recognize a specific component such as the rise component of a sound signal, so errors tend to occur in the measurement of the times tA, tB, tC and tD. By contrast, to determine (tA−tB), (tA−tC), (tA−tD), etc., it is preferable to compare two sound signals to check their difference from each other. Specifically, the correlation is determined as the two times are varied, and the maximum time deviation among the resulting correlations is (tA−tB). This treatment is capable of accurate measurement by comparison of the sound signals in their entirety.

This input device 2b has a simple structure because the microphones 53a through 53d may simply be set up. Here, microphones were described as detecting the sound of contact between the hammer 52 and protective glass 10, but vibrations produced by contact between the hammer 52 and protective glass 10 may also be detected by a vibration sensor.

A structure that can be adopted to detect positions on the display screen struck by the hammer 52 is to set up an ultrasonic emitter in the hammer head, and to set up microphones capable of receiving ultrasonic waves at the four corners of the display 9. Although described above, it should be reiterated that the hammer 52 does not directly strike the display 9. Instead the hammer 52 strikes the protective glass 10, and coordinates where the position of the struck protective glass 10 correspond to the display 9 screen are computed.)

In this structure, an operating signal Ss is output from the switch means 20b when the hammer 52 strikes the protective glass 10, over the display 9. When the operating signal Ss is input to the CPU block 30, an emission signal is supplied at a constant time from the CPU block 30 to the ultrasonic emitter. This allows output of ultrasound from the hammer head at a constant time from the time the glass is struck. The ultrasound is detected by the microphones (53a–53d) in the four corners of the display 9 and is sent to the CPU block. This allows the position where the hammer head strikes the protective glass to be computed. In this structural example, ultrasound is emitted and is detected by microphones, allowing the coordinate position on the display to be specified, so positions can be accurately detected without the erroneous detection of other sounds.

In the embodiment described here, microphones (53a–53d) were located in the four corners of the display, but they may in theory be located in two corners.

A protective glass 10 may be provided as a touch panel on the display 9 screen so that signals from positions where the touch panel has been touched by an input means such as a hammer 52 can be used as signals to compute the position.

As described above in the third embodiment of the invention, the position where a hammer 52 strikes is detected by a sound (or vibration) detector means arranged in the four corners of the display 9, so there is no need to house a photodetector substrate or photoreceiver sensor in the hammer 52, and the structure of hammer 52 can be made simpler and more reliable. It is also more light-weight, and is easier for a player to handle. It is also possible to dispense with a switch means in the hammer 52, making the structure even simpler and more light-weight. In this case, there is no need for signal lines to connect the hammer 52 and the data processing board 15, resulting in better player operability.

The invention claimed is:

1. An image processing device comprising:
   image processing means for executing image processing to move an object to different positions on a display means;
   display means for displaying an image at an object display position based on the image processing;
   contact means movably provided and brought into contact with said display means by the operation of a player;
   input means provided on a side of said display means and generating at least one signal for computing a contact position when said contact means is brought into contact with said display means, such that the strength of the at least one signal depends on the contact position;
   position computing means for computing said contact position based on the at least one signal from the input means; and
   determination means for determining whether a desired positional relationship is established between said contact position and said object display position based on a computed result;
   wherein said image processing means provides prescribed image processing of said object when the determination means determines that the desired positional relationship has been established.

2. The processing device as defined in claim 1, wherein said input means comprises a plurality of detectors for sensing sound or vibration when said contact means is brought into contact with said display means, and said position computing means computes said contact position by comparing a detection timing provided by said plurality of detectors.

3. The image processing device as defined in claim 1, wherein said contact means comprises switch means for generating contact signals indicating contact with said display means, and said position computing means begins processing based on the contact signals generated by said switch means.

4. The image processing device as defined in any of claims 1 through 3, wherein said determination means determines that said prescribed relationship has been established when said contact position is within a predetermined range from said object.

5. The image processing device as defined in any of claims 1 through 3 further comprising:
point calculating means for awarding points when it has been determined by said determination means that said prescribed relationship has been established.

6. The image processing device as defined in claim 5, wherein said display means includes a display surface that is inclined so that the angle between the perpendicular direction and the normal line of the display surface ranges from 3 to 17 degrees.

7. The image processing device as defined in claim 5, wherein said display means comprises a protective cover that covers the display surface on which the images are displayed.

8. An image processing device comprising:
an image processor for executing image processing to move an object to different positions on a display;
a display for displaying an image based on the image processing;
a contact unit movably provided and brought into contact with the display;
an input module provided on a side of the display for generating a position indicating signal when the contact unit is brought into contact with the display at a contact position such that the strength of the position indicating signal depends on the contact position;
a position module for computing the contact position based on the position indicating signal generated by the input module; and
a determiner module for determining whether a desired positional relationship is established between the contact position and an object display position, where said image processor provides prescribed image processing of the object when the desired positional relationship has been established.

9. The image processing device of claim 8, wherein the contact unit is a hammer-type input device.

10. The image processing device of claim 8, wherein the contact unit includes a vibration switch for detecting the contact with the display.

11. The image processing device of claim 8, wherein the contact unit includes a photoreceiver for receiving the brightness data of the display.

12. The image processing device of claim 11, wherein the position module receives brightness data from the photoreceiver to compute the contact position.

13. The image processing device of claim 11, wherein the contact unit includes an optic fiber for sending brightness data of the display to the photoreceiver.

14. The image processing device of claim 11, wherein the photoreceiver is provided within a photodetector substrate on the contact unit.

15. The image processing device of claim 14, wherein the photodetector substrate is located in a case unit affixed to the side of the contact unit.

16. The image processing device of claim 8, wherein the prescribed relationship is established if the contact position is within a predetermined distance from the object display position.

17. The image processing device of claim 16, wherein if the prescribed relationship is established the prescribed image processing causes the disappearance of the image on the display.

18. The image processing device of claim 16, wherein the predetermined distance from the object display position forms a rectangular target area around the object.

19. The image processing device of claim 8, wherein the display includes a protective cover.

20. The image processing device of claim 8, wherein the display includes a surface forming an angle in a range from 3 to 17 degrees from a vertical direction.

21. The image processing device of claim 8, wherein the contact unit includes a buffer for softening the impact on the display during the contact.

22. The image processing device of claim 8, wherein the contact unit includes a sound detector for detecting and receiving a resulting sound of the contact between the contact unit and the display.

23. The image processing device of claim 22, wherein the input module receives signals from the sound detector when the sound detector detects and receives the resulting sound of the contact between the contact unit and the display for computing the contact position.

24. The image processing device of claim 22, wherein the sound detector is a microphone.

25. The image processing device of claim 8, wherein the display includes a touch screen where the contact between the contact unit and display generates positioning information.

* * * * *